June 14, 1927. W. W. MORRILL ET AL 1,632,092
VELOCIPEDE
Filed May 22, 1926
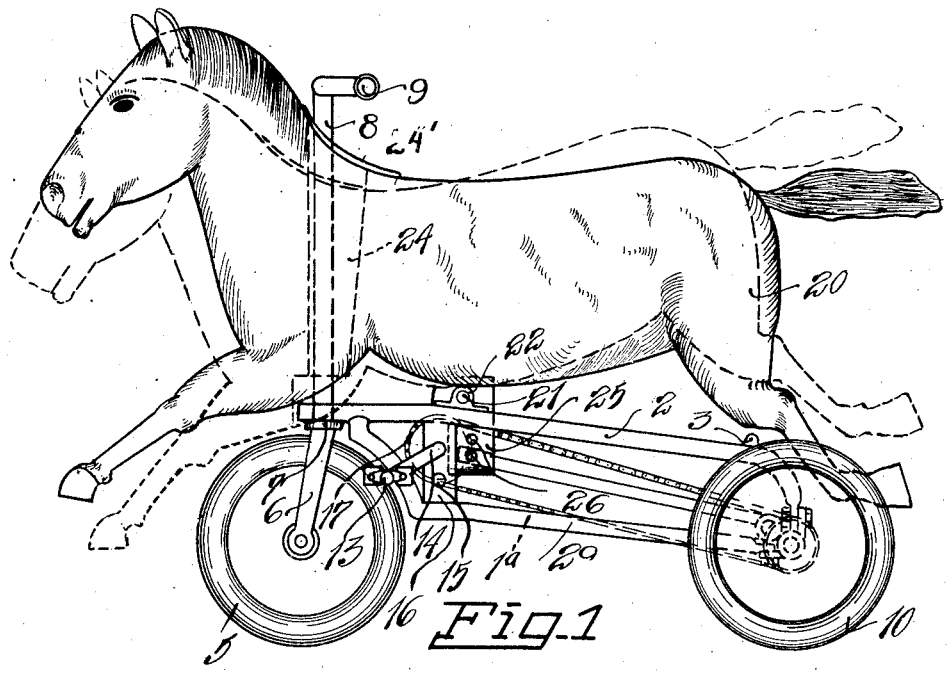
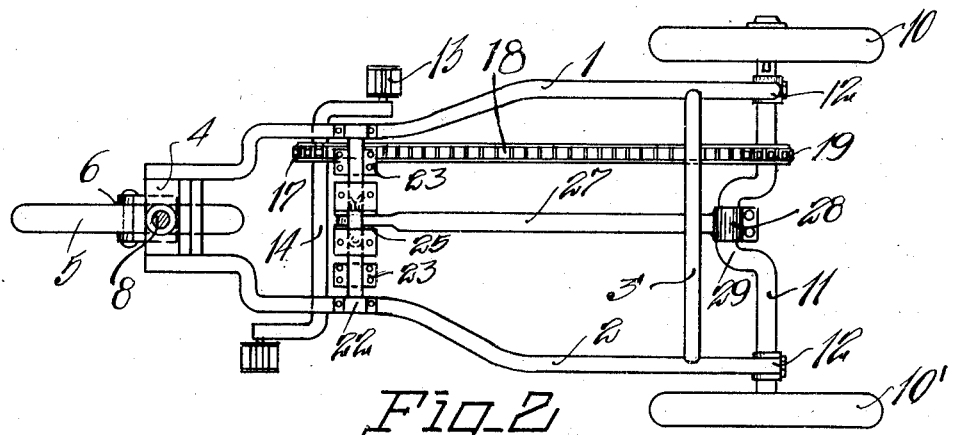
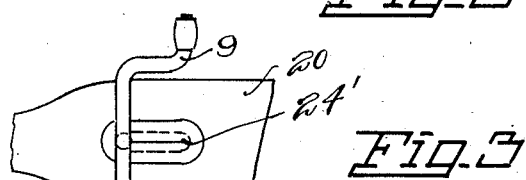
Inventor
William W. Morrill
William V. Morrill
Herbert E. Smith
Attorney Patented June 14, 1927.

1,632,092

UNITED STATES PATENT OFFICE.

WILLIAM W. MORRILL AND WILLIAM V. MORRILL, OF SPOKANE, WASHINGTON.

VELOCIPEDE.

Application filed May 22, 1926. Serial No. 110,991.

Our invention relates to improvements in velocipedes of the three wheel type, embodying a bicycle crank-and-chain propulsion, and utilizing a rocking horse for the seat of the rider which is actuated by connections from the driving or propelling shaft of the velocipede or vehicle.

The primary object of the invention is the provision of a device of this character which is constructed to insure safety to the rider and which may be operated with facility and slight expenditure of labor, and at the same time provide an equestrian motion for the rider of the vehicle or velocipede.

The invention consists in certain novel combinations and arrangements of parts involving the structure of the velocipede, its propulsion mechanism and the means for rocking the horse, as will hereinafter be more fully set forth and claimed.

In the accompanying drawings we have illustrated one complete example of the physical embodiment of our invention wherein the parts are combined and arranged in accordance with the best mode we have so far devised for the practical application of the principles of our invention.

Figure 1 is a side elevation of a velocipede embodying our invention, showing by dotted lines the range of movement of the rocking horse.

Figure 2 is a plan view of the velocipede with the horse omitted, for convenience of illustration.

Figure 3 is a detail view showing the independent relation of the handle bars and steering post to the horse.

Figure 4 is a detail view showing the rock yoke and pitman connection.

In the preferred form of our invention as illustrated in the drawings we have adopted a comparatively low-down main frame of generally rectangular shape and comprising upper longitudinal side bars 1 and 2 and complementary, lower side bars 1ª and 2ª. Near their rear ends the side bars 1 and 2 are joined by a cross brace 3 and the side frame bars converge toward the front where they are joined by a cross head 4 to form a rigid, well braced main frame or structure for the velocipede.

A single, front steering wheel 5 is journaled in the forks 6 below the steering head 7, and the post 8 is journaled in the frame head 4 and extends upwardly a suitable distance for the convenience of a child. By means of the rigid handle bars 9 at the top of the steering post the front steering wheel may be manipulated freely for steering the vehicle in usual manner.

One of the two rear wheels 10 and 10' located outside of the frame is used as the driving wheel. The wheel 10 is fixed on the drive shaft 11 which is journaled at 12 in the bearings provided therefor at the downwardly curved ends of the side bars 1 and 2 at their junction with the lower side bars 1ª and 2ª.

Power is applied to the velocipede by manipulating the pedals 13 on the outer ends of the pedal or crank shaft 14 which may be journaled in either of two or more journal bearings 15 in the spaced bearing blocks 16 which are vertically disposed and rigidly joined to the upper and lower side bars of the main frame as best seen in Figure 1. The pedal shaft is shown as journaled in its bearing blocks to adapt the vehicle for use to a small boy or girl with short legs; for a larger rider with longer legs it will be apparent that the journal bearings for the shaft may be changed to adapt the pedals to the difference in the length of the legs.

Power is transmitted from the pedal shaft to the operating shaft 11 through a sprocket wheel 17 on the first mentioned shaft, a longitudinally disposed sprocket chain 18, and a driven sprocket wheel 19 on the latter shaft, and of course as the shaft 11 is revolved the velocipede is propelled through the drive wheel 10.

A rocking horse 20 constructed in suitable manner is provided as the seat for the rider who propels the velocipede, the rider occupying the seat in usual equestrian fashion, straddling the horse.

The range of movement of the rocking horse is indicated by dotted lines in Figure 1 in combination with the full line position, and a transversely disposed rock shaft 21 is utilized as the pivot for the rocking horse. The rock shaft is journaled in bearings 22 on the frame and in complementary bearings 23 on the horse, the bearings of course being alined, as indicated in Figure 2 to hold the horse and form a substantial seat for the rider which is free from wobbling or lateral movement.

To accommodate the steering post 8 the rocking horse is provided with a vertical slot 24 as indicated by dotted lines in Figure 1 to permit the required movement of the horse, and the latter is free to move without obstruction from other parts of the velocipede. A slit pad 24' of rubber or other suitable material is used to cover the upper end of the slot 24, and the post 8 passes through the pad.

The movement of the horse is developed from the operating shaft 11 independently of the pedal mechanism, but of course the power for initiating the movement is developed in the pedal mechanism. For this purpose the rock shaft is provided with a rigid rock yoke 25 depending therefrom at the longitudinal center of the velocipede and between the journal bearings for the rocking horse or its rock shaft.

The rock yoke is provided with two or more bolt holes 26 for the connection thereto by a pin 26' of a pitman 27 which is located at the longitudinal center of the velocipede and extends rearwardly from the rock shaft toward the operating shaft. A bearing sleeve 28 on the pitman is journaled on the crank portion 29 of the operating shaft, and it will be apparent that as the operating shaft is revolved the pitman, through its reciprocating motion will oscillate the rock arm and rock shaft to rock the horse. By moving the forward connection or wrist pin of the pitman to the upper one of the journal holes 26 of the rock arm the leverage on the arm is increased, and thereby the rocking movement of the horse is limited.

It will be apparent that the horse, which is equally balanced or counterbalanced on its pivot or rock shaft, is thus provided with a motion acquired through power developed from the pedal mechanism, and transmitted thereto through the operating shaft, thereby propelling the velocipede with a simultaneous movement of the rocking horse.

The rider is located directly above the rock-shaft or center of rocking movement of the horse, and therefore does not partake of a rocking movement that would be sufficient to remove the feet from the pedals. By this construction and arrangement of parts the velocipede may be propelled with facility and comparatively slight expenditure of labor to develop power, and the rocking movement of the horse affords a balance effect for conserving the developed power.

When it is desired to render the horse inactive the pin 26' may be drawn allowing the pitman to drop on the rock yoke 25 and move freely thereon. The rear legs of the horse will then rest or lock on the cross bar 3.

Having thus fully described our invention, what we claim as new and desire to secure by Letters Patent is:—

1. In a velocipede the combination with a main frame, steering wheel and rear driving wheel, and a crank shaft for the driving wheel, of a pedal mechanism and means for transmitting power therefrom to the crank shaft, a rock shaft having a rock yoke and rocking seat supported on the frame, and a pitman connecting from the crank shaft to the rock yoke.

2. The combination with a supporting frame, a steering wheel, a rear crank shaft and driving wheel thereon, of a pedal mechanism, means for transmitting power from the pedal mechanism to the crank shaft, a rocking seat and its shaft supported on the frame, a rock yoke on the shaft, a pitman connecting said crank arm and rock yoke, and means for adjusting the leverage between said pitman and rock yoke.

In testimony whereof we affix our signatures.

WILLIAM W. MORRILL.
WILLIAM V. MORRILL.